(12) United States Patent
Brehm et al.

(10) Patent No.: US 6,893,009 B2
(45) Date of Patent: May 17, 2005

(54) VIBRATION DAMPER

(75) Inventors: Stefan Brehm, Hennef (DE); Jörg Brandhofer, Eitorf (DE); Michael Müller, Hennef (DE)

(73) Assignee: ZF Sachs AG, Eitorf (DE)

( * ) Notice: Subject to any disclaimer, the term of this patent is extended or adjusted under 35 U.S.C. 154(b) by 0 days.

(21) Appl. No.: 10/755,585

(22) Filed: Jan. 12, 2004

(65) Prior Publication Data

US 2004/0140600 A1 Jul. 22, 2004

(30) Foreign Application Priority Data

Jan. 22, 2003 (DE) .......................................... 103 02 211

(51) Int. Cl.⁷ ................................................. F16F 9/04
(52) U.S. Cl. ............................... 267/64.24; 267/64.21; 267/64.26
(58) Field of Search .......................... 267/64.21, 64.24, 267/64.16, 64.19, 64.17, 64.11, 64.27, 64.13, 64.25, 64.26; 72/370.13; 29/434, 243.523

(56) References Cited

U.S. PATENT DOCUMENTS

| | | | | |
|---|---|---|---|---|
| 5,649,691 A | * | 7/1997 | Handke et al. | 267/64.21 |
| 5,669,597 A | * | 9/1997 | Rittstieg et al. | 267/64.17 |
| 6,237,902 B1 | * | 5/2001 | Lindstrom | 267/64.16 |
| 6,247,346 B1 | * | 6/2001 | Dickson, Jr. | 72/370.13 |
| 6,536,749 B1 | * | 3/2003 | Luhmann et al. | 267/64.19 |
| 6,685,173 B2 | * | 2/2004 | Oldenettel et al. | 267/64.24 |
| 6,742,236 B1 | * | 6/2004 | Dion et al. | 29/434 |

* cited by examiner

Primary Examiner—Robert A. Siconolfi
Assistant Examiner—Melanie Torres
(74) Attorney, Agent, or Firm—Cohen, Pontani, Lieberman & Pavane

(57) ABSTRACT

Vibration damper, including a damping element and a pneumatic spring, wherein the damping element has a container tube, which is connected to a roll-off piston of the pneumatic spring. The roll-off piston is connected via an air suspension bellows acting as a rolling diaphragm to an external guide mounted concentrically and with freedom of axial movement with respect to the roll-off piston, the air suspension bellows and the roll-over piston forming the boundaries of a space filled with pressurized gas. The container tube is prepared for the installation of the roll-off piston by a non-cutting procedure suitable for mass production, wherein a length of tubing having the diameter of the container tube is mounted on a mandrel and clamped at both ends so that its length cannot change, and a pair of flow-turning/rotary-swaging rolls is pressed against the tubing and advanced toward each other to form an area of squeezed material. The rolls are then moved radially while being advanced axially over the area of squeezed material to form a first contour having a bevel, a cylindrical surface, and an axial stop for fitting the roll-off piston to the container tube.

16 Claims, 2 Drawing Sheets

VIBRATION DAMPER

BACKGROUND OF THE INVENTION

1. Field of the Invention

The invention pertains to a vibration damper, comprising a damping element and a pneumatic spring, wherein the damping element has a container tube, which is connected to a roll-off piston of the pneumatic spring. The roll-off piston is connected by an air suspension bellows acting as a rolling diaphragm to an external guide, mounted concentrically and with freedom of axial movement with respect to the roll-off piston. The air suspension bellows and the roll-off piston form the boundaries of a space filled with pressurized gas.

2. Description of the Related Art

Vibration dampers of the type described above are used in motor vehicles, in which they form part of the suspension which supports, for example, the driver's cab of a commercial vehicle on the chassis to isolate the driver's cab as effectively as possible from the vibrations introduced from the roadway into the chassis via the wheel suspensions. The external guide of the pneumatic spring and the piston rod of the damping element are connected to the cab, whereas the damping element is connected by way of an attachment part to the chassis; the operation of the pneumatic spring depends on its geometric dimensions, on the pressure prevailing in the gas space, and on the profile of the roll-off piston, over which the air suspension bellows rolls. The solution to the problem of sealing off the gas space from the atmosphere all the way around the container tube, this gas space also extending to the space around the piston rod, namely, by the use of an O-ring between the roll-off piston of the pneumatic spring and the container tube of the damping element, belongs to the state of the art. To divert the axial force component created by the high pressure in the gas space into the container tube, the conventional design provides an adapter ring, which requires a great deal of effort to manufacture and which must be welded to the container tube. In addition, the O-ring is installed in or near the adapter ring, which complicates the design and makes it more expensive. A contour of the roll-over piston is supported axially against the adapter ring, which absorbs the axially oriented forces of the pneumatic spring and diverts them into the container tube. The larger the number of units produced, however, the greater the need for rationalizing the means used to provide the above-mentioned support and sealing of the roll-over piston on the container tube.

SUMMARY OF THE INVENTION

For the axial support of the roll-over piston on the container tube and for the sealing of the roll-over piston against the container tube, the expensive adapter ring is omitted and the container tube is provided with a first contour, which makes it possible for the roll-over piston to be connected easily to the container tube, and this connection is used simultaneously to connect the support to the seal. For this purpose, the first contour has a circumferential, bead-like elevation projecting beyond the outside diameter of the container tube, into which elevation a bevel, a groove, a lateral surface, and a shoulder are integrated. The groove is intended to receive a sealing ring, which rests against the inner surface of the roll-over piston when this piston is pushed over the lateral surface of the first contour on the container tube. During this assembly procedure, the end surface of the roll-over piston will come into contact with the shoulder, whereby it assumes a defined position, which is important to ensure that it will function properly. The roll-over piston is provided with a conical expansion, which makes it possible for the roll-over piston to be threaded cleanly over the bevel and to travel over the sealing ring without damaging it or impairing its sealing function.

The container tube also has a second contour, the outside diameter of which extends beyond that of the container tube and has a connecting area for a first end of a bellows, the other end of which is attached to the external guide and which thus protects the sensitive parts of the vibration damper, i.e., those which move against each other during operation of the vehicle, from dirt. Because the gas space of the pneumatic spring is always under pressure, it is merely necessarily to secure the roll-over piston axially in place on the container tube of the damping element in the direction pointing away from the pneumatic spring. The shoulder used for this purpose, which is integrated into the first contour on the container tube, projects beyond the outside diameter of the container tube and extends around the circumference, whereby the production process used to realize this shoulder is referred to as flow-turning or rotary swaging. This process makes it possible to produce the desired form without actually cutting any metal and to obtain all of the contours required for the connection of the roll-over piston to the container tube with the precise dimensions required in a reproducible manner. The process is suitable for mass production and, once the one-time investment for machinery and equipment has been paid, is extremely low in cost. The process is described in detail further below.

The invention presented here provides a vibration damper consisting of a damping element and a pneumatic spring, in which an inexpensively manufactured container tube of the damping element is designed in such a way that a roll-over piston as a component of the pneumatic spring can be connected easily, with minimal assembly effort, to the container tube while also meeting the requirements with respect to leak-tightness and strength.

An exemplary embodiment of a vibration damper in which a roll-over piston of a pneumatic spring is fixed axially in place on a container tube of a damping element and simultaneously sealed is explained below on the basis of several drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
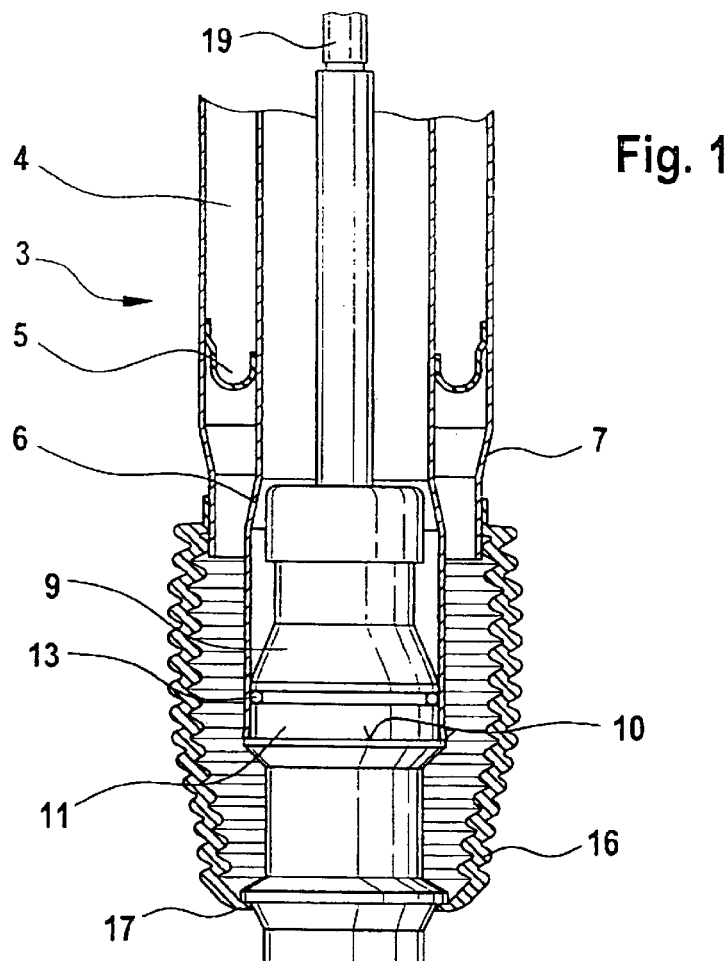
FIG. 1 shows a vibration damper including of a pneumatic spring and a damping element, in which the roll-over piston of the pneumatic spring and a container tube of the damping element are connected to each other.

FIG. 1 shows a vibration damper, which includes of a damping element 1 and a pneumatic spring 3, wherein the damping element 1 has a container tube 2, a fastening part 18, and a piston rod 19. The pneumatic spring 3 includes an air suspension bellows 5, acting as a rolling bellows; a prepressurized gas space 4; an external guide 7 connected to the mass which is to be kept as free as possible of vibrations; and a roll-over piston 6. The air suspension bellows 5 acts as an elastic element which connects the external guide 7 to the roll-over piston 6, whereby the air suspension bellows 5 rolls over a roll-over profile of the roll-over piston 6 when the external guide 7 executes axial movement with respect to roll-over piston 6; the air suspension bellows 5 thus assumes the function of a spring as a result of the compression of the gas. A bellows 16 takes over the job of shielding important functional parts against dirt; one end is connected to the external guide 7, whereas the other end is connected by way of a connecting area 17 to the container tube 2.

Figure 2:
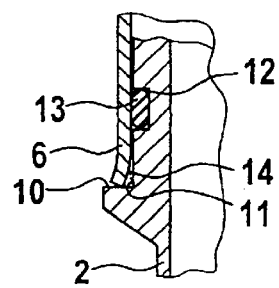
FIG. 2 shows an enlarged view of the position of an end surface of the roll-over piston with respect to a shoulder on the container tube and the position of a sealing ring in a groove of a first contour.

FIG. 2 shows a partial, enlarged cross section of the area where the roll-over piston 6 is attached to the container tube 2; that is, it shows how the end surface of the roll-over piston 6 rests against a shoulder 10. In the area of the end surface, a conical expansion 14 is provided on the roll-over piston 6, the purpose of which is, first, to make it easier for the piston to be the threaded over the bevel 9 and onto the lateral surface 11 of a first contour 8 during assembly and, second, to ensure that a sealing ring 13, preferably designed as a toroidal sealing ring, installed in a groove 12 in the first contour 8, is not damaged by sharp edges.

Figure 3:
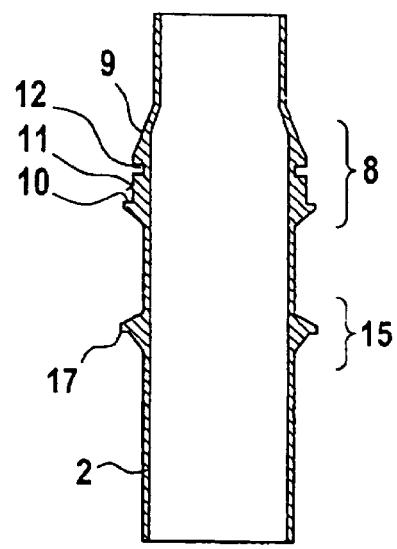
FIG. 3 shows the container tube with the first contour and a second contour.

FIG. 3 shows a longitudinal section through the container tube 2, which illustrates the design and the position of the first contour 8 and also of a second contour 15. The second contour, with its previously mentioned connecting area 17, is used for the installation of the bellows 16, which can be attached there in a positive manner.

Figure 4:
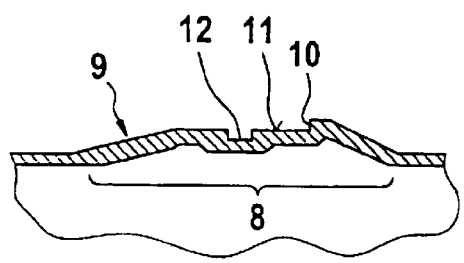
FIG. 4 shows a partial cross section of the first contour, consisting of a bevel, the groove, a lateral surface, and a shoulder.
Figure 5:
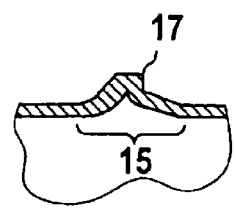
FIG. 5 shows the second contour, which serves as a connecting area for a bellows.

FIGS. 4 and 5 show how the first contour 8 and the second contour 15 are formed on the inside surface of the container tube 2, when the container tube 2 is being produced by the flow-turning/rotary-swaging process. Here, at least one roll/jaw is brought up against the unfinished container tube 2, which has been pushed onto a mandrel and set to rotate, as a result of which the tube material starts to flow under the high pressure of the roll/jaw. The material is thus squeezed up in the direction in which the tool is fed. According to this principle, the unfinished container tube 2 becomes thinner at the original diameter and consequently thicker at the squeezed-up places, thus larger in diameter, provided that it is clamped at the ends to the mandrel and prevented from changing its original length. When the first contour 8 and/or the second contour 15 is being produced, it is advantageous to use two rolls, which are advanced toward each other, so that the material is not only squeezed but also adjusted to the proper dimensions at the same time. In this way, the first contour 8 can be produced with an accuracy which meets the functional requirements; that is, the bevel 9, the groove 12, the lateral surface 11, and the shoulder 10 can be produced with dimensions which are accurate enough to ensure the proper joining of the roll-over piston 6 to the container tube 2, the required overlapping of the two diameters, and the sealing function. For special requirements, the radii and edges on the contours 8 and 15 can be finished by a final turning operation, but it is desirable to avoid this for cost reasons.

A process is therefore proposed for the production of the container tube 2, by means of which both a first contour 8 for the gas-tight attachment of the roll-over piston 6 to the container tube 2 and a second contour 15 for the attachment of the folding bellows 16 can be formed, whereby the following process steps will be used for the previously mentioned process of flow turning/rotary swaging:

(1) a machine suitable for the flow-turning/rotary-swaging process is provided for the flow turning/rotary swaging of tubing;

(2) a length of tubing with the diameter of the container tube 2 is clamped onto a device;

(3) this length of tubing is mounted on a mandrel and clamped at least at one end;

(4) the mandrel supporting the length of tubing is rotated, and at least one flow-turning/swaging jaw is brought into position;

(5) a groove 12 a lateral surface 11, a shoulder 10, and a bevel 9 are formed on a first contour 8, and optionally a connecting area 17 is formed on a second contour 15; and (6) optionally the contours 8, 15 are precision-turned to correct the radii or fillets.

The advantage of the invention over the state of the art is that the container tube 2 is prepared for the installation of the roll-over piston 5 by a non-cutting procedure suitable for mass production, whereby a simple and lost-cost operation joining the piston 6 onto the container tube 2 by pushing against the shoulder 10 is sufficient to create one of the damping element subassemblies.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
   a container tube formed with a circumferential first contour, said first contour comprising a cylindrical surface formed with a circumferential groove and an axial stop;
   a roll-off piston fitted onto said cylindrical surface concentrically and in a gas tight manner;
   an external guide mounted concentrically and with freedom of axial movement relative to said roll-off piston; and
   an air suspension bellows connecting said roll-off piston to said external guide and acting as a rolling diaphragm, said bellows and said roll-off piston forming the boundaries of a gas space filled with a pressurized gas,
   wherein said container tube is formed with a circumferential second contour having a connecting area for the attachment of a second bellows.

2. A vibration damper as in claim 1 wherein said first contour comprises an area of axially squeezed material produced by the flow-turning/rotary swaging process.

3. A vibration damper as in claim 2 wherein said area of axially squeezed material forming said first contour is produced by a non-cutting process to obtain the cylindrical surface, the circumferential groove, and the axial stop.

4. A vibration damper as in claim 1 wherein said second contour comprises an area axially squeezed material produced by the flow-turning/rotary swaging process.

5. A vibration damper as in claim 4 wherein said area of axially squeezed material forming said second contour is produced by a non-cutting process to obtain the connecting area for the attachment of a second bellows.

6. A vibration damper as in claim 1 wherein said roll-off piston has an axial end which abuts the axial stop of said circumferential first contour, said roll-off piston having an inside diameter which is conically expanded at said axial end to serve as an assembly aid.

7. A process for forming a container tube for a vibration damper comprising a damping element and a pneumatic spring, said process comprising:
   providing a machine suitable for flow-turning/rotary swaging of tubing;
   providing a length of tubing with the diameter of the container tube;
   mounting said length of tubing onto a mandrel and clamping both ends so that said length cannot change;
   pressing a pair of flow-turning/rotary-swaging rolls against said length of tubing and advancing said rolls toward each other while rotating said mandrel, thereby forming a first area of squeezed material; and
   moving said rolls radially while advancing said rolls axially over said first area of squeezed material to form a first contour having a bevel, a cylindrical surface, and an axial stop.

8. A process as in claim 6 further comprising:
   pressing said pair of flow-turning/rotary-swaging rolls against said length of tubing and advancing said rolls toward each other while rotating said mandrel, thereby forming a second area of squeezed material; and
   moving said rolls radially while advancing said rolls axially over said second area of squeezed material to form a second contour having a connecting area for a bellows.

9. A process as in claim 8 further comprising precision turning said second contour to correct the radii and fillets.

10. A process as in claim 9 further comprising precision turning said second contour to correct the radii and fillets.

11. A vibration damper comprising:
   a container tube formed with a circumferential first contour, said first contour comprising a cylindrical surface formed with a circumferential groove and an axial stop;
   a roll-off piston fitted onto said cylindrical surface concentrically and in a gas tight manner, said roll-off piston having an axial end which abuts axial stop of said circumferential first contour, said roll-off piston having an inside diameter which is conically expanded at said axial end to serve as an assembly aid;
   an external guide mounted concentrically and with freedom of axial movement relative to said roll-off piston; and
   an air suspension bellows connecting said roll-off piston to said external guide and acting as a rolling diaphragm, said bellows and said roll-off piston forming the boundaries of a gas space filled with a pressurized gas.

12. A vibration damper as in claim 11 wherein said first contour comprises an area of axially squeezed material produced by the flow-turning/rotary swaging process.

13. A vibration damper as in claim 12 wherein said area of axially squeezed material forming said first contour is produced by a non-cutting process to obtain the cylindrical surface, the circumferential groove, and the axial stop.

14. A vibration damper as in claim 11 wherein said container tube is formed with a circumferential second contour having a connecting area for the attachment of a second bellows.

15. A vibration damper as in claim 14 wherein said second contour comprises an area axially squeezed material produced by the flow-turning/rotary swaging process.

16. A vibration damper as in claim 15 wherein said area of axially squeezed material forming said second contour is produced by a non-cutting process to obtain the connecting area for the attachment of a second bellows.

* * * * *